US012808258B2

(12) United States Patent
Lev

(10) Patent No.: US 12,808,258 B2
(45) Date of Patent: Nov. 24, 2026

(54) DRONE PORTAL INTEGRAL TO A DOOR

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 33 days.

(21) Appl. No.: 18/650,350

(22) Filed: Apr. 30, 2024

(65) Prior Publication Data

US 2025/0334002 A1 Oct. 30, 2025

(51) Int. Cl.
*E06B 7/32* (2006.01)
*B64U 70/90* (2023.01)

(52) U.S. Cl.
CPC ................ *E06B 7/32* (2013.01); *B64U 70/90* (2023.01)

(58) Field of Classification Search
CPC ............ E06B 7/32; B64U 70/90; B64F 1/007
See application file for complete search history.

(56) References Cited

U.S. PATENT DOCUMENTS 730,461 A * 6/1903 Isaacson .................. E06B 7/32 49/168
914,528 A * 3/1909 Thinnes .................... B65F 1/12 220/477
1,186,566 A * 6/1916 Fogg ......................... E06B 7/32 49/169
2,027,491 A * 1/1936 Percy ........................ E06B 7/32 52/27
3,091,221 A * 5/1963 Worm ....................... E06B 7/32 43/61
3,203,052 A * 8/1965 Curtis, Jr. ................. E06B 7/30 49/70
3,698,143 A * 10/1972 Francis .................. A47G 29/14 312/286
4,001,970 A * 1/1977 Miyamoto ................ E06B 7/30 49/171
4,763,444 A * 8/1988 Ritchie ..................... E06B 7/30 359/511
4,969,292 A * 11/1990 Reid ......................... E06B 7/32 160/90
5,161,328 A * 11/1992 Traue ........................ E06B 7/32 49/171
5,191,747 A * 3/1993 Tengquist ................. E06B 7/32 52/27
7,493,727 B1 * 2/2009 Broussard ................. B60P 3/34 296/26.14
9,601,379 B1 3/2017 Pawlak et al.
10,512,351 B1 * 12/2019 Valeriano ............ E05B 47/0001
10,553,696 B2 2/2020 Ando et al.
10,588,440 B1 * 3/2020 Kajgana ................ E06B 3/5892
10,703,507 B2 7/2020 Comerford
10,881,233 B1 * 1/2021 Walsh ....................... E06B 7/32
10,903,317 B1 1/2021 Frougier et al.
(Continued)

FOREIGN PATENT DOCUMENTS

CN 111577075 8/2020
JP 2020-051176 4/2020

*Primary Examiner* — Justin B Rephann

(57) ABSTRACT

A portal and method for a drone to transit from one side of door to the other. The portal having an opening for each side of the door and having at least two levels, and a temporary landing area. The portal structure with no moving parts that allows the drone to transit the door.

8 Claims, 5 Drawing Sheets

(56) References Cited

U.S. PATENT DOCUMENTS

| | | | | |
|---|---|---|---|---|
| 11,432,670 | B2 * | 9/2022 | Nakanishi | B64F 1/368 |
| 11,702,884 | B2 * | 7/2023 | Daniels | E06B 7/32<br>49/70 |
| 2014/0190081 | A1 * | 7/2014 | Wanjohi | A47G 29/126<br>49/504 |
| 2018/0105289 | A1 * | 4/2018 | Walsh | G06Q 10/1097 |
| 2019/0217971 | A1 * | 7/2019 | Comerford | B64D 1/02 |
| 2019/0288004 | A1 | 9/2019 | Smith et al. | |
| 2019/0300202 | A1 * | 10/2019 | High | B64F 1/32 |
| 2020/0013008 | A1 * | 1/2020 | Newcomb | A47G 29/14 |
| 2020/0385119 | A1 | 12/2020 | Hanke | |
| 2021/0005033 | A1 * | 1/2021 | Roman | G06Q 10/0833 |
| 2021/0363816 | A1 * | 11/2021 | Daniels | E06B 7/34 |
| 2022/0031105 | A1 * | 2/2022 | Newcomb | H04N 7/186 |
| 2022/0315221 | A1 | 10/2022 | Nishimura et al. | |

* cited by examiner

DRONE PORTAL INTEGRAL TO A DOOR

FIELD AND BACKGROUND OF THE INVENTION

The present invention, in some embodiments thereof, relates to entry of a drone into a structure and more particularly, but not exclusively, the entry through a door.

Typically, entry of a drone into a structure involves a door or other structure that limits entry into the structure. Another feature that is used involves motors or other mechanical arrangement to allow a drone to land and then transport the drone into a structure.

SUMMARY OF THE INVENTION

According to an aspect of some embodiments of the present invention there is provided a drone portal integral to a door for a drone to transit through the portal comprising:

- an opening in each of the side of the door facing the inside of the door and the side facing the outside of the door;
- a channel between the openings, the channel having lower surface;
- the portal has two or more levels; and
- at least one level configured requiring the drone to temporarily park for at least a second while transiting the portal and then moving through the channel;
- wherein the portal has no moving parts.

According to an aspect of some embodiments of the present invention there is provided a drone portal integral to a door for a drone to transit through the portal comprising:

- an opening in each of the side of the door facing the inside of the door and the side outside of the door;
- a channel between the opening having a continuous lower surface;
- the continuous lower surface is at an oblique angle where the side adjacent opening facing the outside of the door is at a higher elevation than the opening facing the inside of the door;
- wherein the drone to parks on the angled lower surface and slides by gravity towards the opening of the door facing the inside;
- wherein the portal has no moving parts.

According to an aspect of some embodiments of the present invention there is provided a method for a drone to transit through a portal integral to a door comprising:

- entering an opening of the portal in the door, the portal having no moving parts;
- landing at least temporarily on a lower surface in the portal;
- deactivating drone rotor and reactivating drone rotor;
- moving through the portal;
- exiting the portal through a door opening.

According to an aspect of some embodiments of the present invention there is provided a method for a drone to transit through a portal integral to a door comprising:

- entering an opening of the portal in the door, the portal having no moving parts;
- landing on a lower surface in the portal, the lower surface is continuous and at an oblique angle, wherein the side facing the outside of the door is at a higher elevation than the side facing the interior side of the door;
- deactivating drone rotor;
- sliding on the continuous lower surface through the portal by gravity;
- exiting the portal through a door opening.

According to some embodiments of the invention, the drone portal of claims 1, 5, 9, and 12 wherein the two or more levels includes one or more of a shelf, each of the one or more shelves is adjacent to the opening and each shelf having walls extending upwardly the shelves According to some embodiments of the invention the drone portal of claims 1 and 9 wherein the channel has at least one higher elevation portion in between two lower elevation portions, dividing the channel.

According to some embodiments of the invention drone portal of claims 1, 5, 9, and 12 wherein at least a portion of the portal is covered with a material that is one or more of sound proofing, cushioning, a woven fabric, and a flexible tufted fiber.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. The figures are not drawn to scale unless otherwise indicated. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
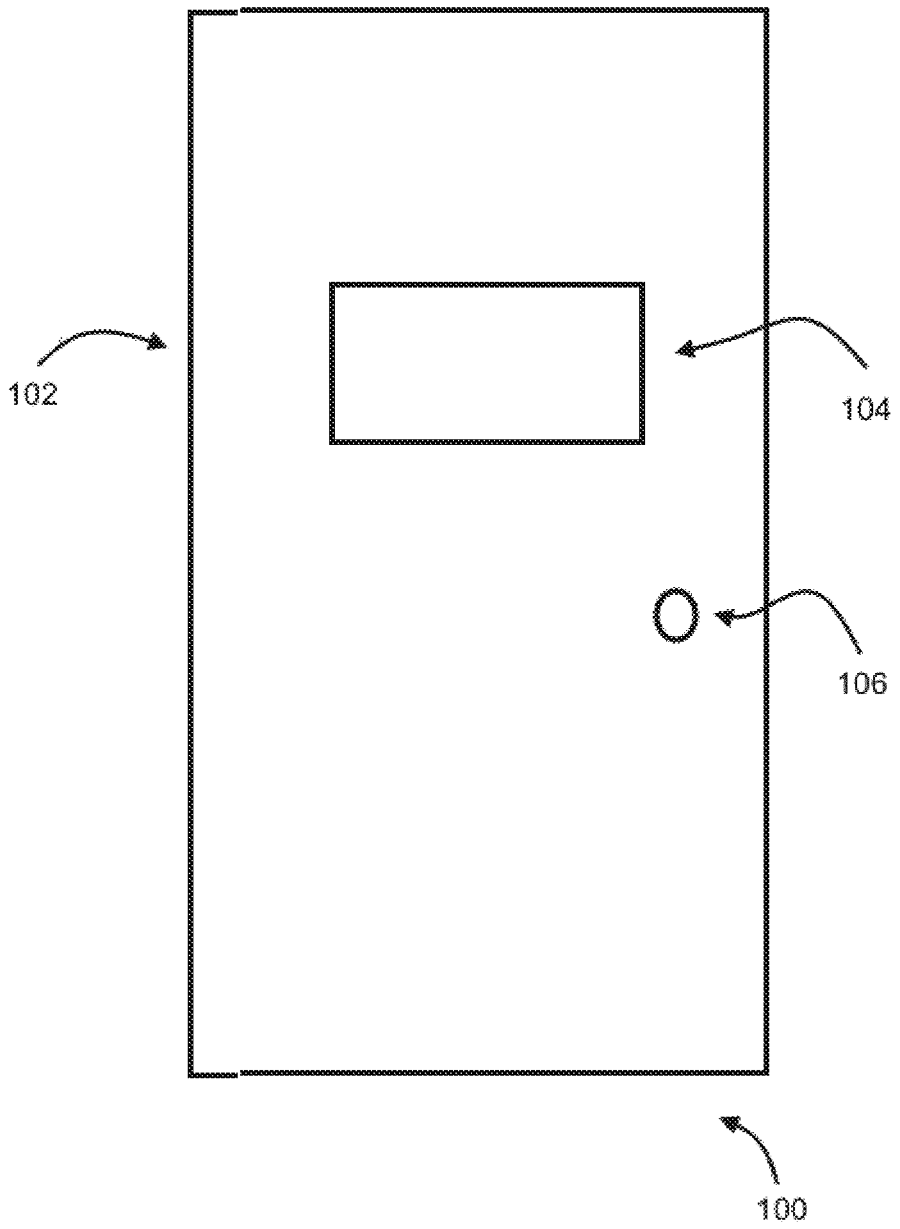
FIG. 1 is a plan view of the portal facing the portal and door from outside the structure and door.

The present invention, in some embodiments thereof, relates to entry of a drone into a structure and more particularly, but not exclusively, the entry through a door.

The current application describes a portal without moving parts that is integral to a door. However, the invention is not limited to a door, but would also be applicable to a wall, roof or other component of a structure to allow the passage of a drone from the exterior of the structure to an interior of the structure.

The portal without moving parts is an advance over other devices that use gates or other barriers and motors to regulate and transport drones from the exterior of structures to the interior and the reverse. However, the moving parts result in a maintenance burden, complexity in operation, and a less reliable apparatus and method.

The invention of this application requires the drone to maneuver to the entrance of the portal by flying over a side wall of an exterior shelf. The path through the portal is not a line of sight.

After the drone has passed the side wall it approaches a landing area. The landing area allows the drone to touch down in the portal. In some embodiments the landing is temporary. "Temporary" in at least some embodiments means that the drone deactivates its rotor and then reactivates the rotor. The deactivation and reactivation of the rotor is can be in as little as two (2) seconds. The invention of this application does not permit the drone to directly move through the portal. "Directly" means that the drone transits the portal and can enter and exit the structure with the drone's rotor activated the transit. In this way the invention secures the portal and structure. The interruption of the drone's passage through the portal also serves to secure the portal. "Door" is not limited to a door at the entrance to a structure, but is also intended to include the wall of a structure.

After the rotor(s) are reactivated the drone moves through the portal to the interior of the door. In some embodiments the drone moves under its own power. After transiting to the interior of the door the drone rises to fly over the interior shelf side walls.

The invention also secures the entrance of the structure blocking the line of sight from the exterior of the structure. While the embodiment does not require a gate to the portal blocking access, it also does not allow visibility of the interior of the structure.

In another embodiment, the drone lands on lower surface of the portal that has an oblique angle from the exterior of the door to the interior of the door allowing the drone to land, deactivate its rotor and slide by gravity to the interior of the structure. The oblique angle of the lower surface of the portal permits the transit of the drone without flight and without moving parts. As in the previous embodiment, the portal requires the drone to maneuver into the portal so that it is required to clear the barrier of a side wall to a shelf. In this embodiment the shelf exterior to the door unlike the previous embodiment may be at an oblique angle like the lower surface of the portal . . . . Unlike the previous embodiment, the drone lands and deactivates its rotor. The advantage of this embodiment over a more conventional apparatus is that the drone does not fly to transit the portal. As in the previous embodiment, there are no moving parts.

Optionally, this embodiment has a stop to control the drone as it slides on the angled lower surface of the portal. This stop protects the drone from contact with an interior side wall again without moving parts. The stop may also be cushioned to prevent damage to the drone.

To exit the interior of the structure through a portal integral to a door, the drone temporarily lands deactivates it rotor, reactivates its rotor and rises above the exterior shelf wall. In some embodiments the interior shelf wall is optional.

In another embodiment, at least a portion of the interior surface is covered in a material to quiet operation. Sound proofing materials for example may be mass loaded vinyl, acoustic foam, and sound insulation. "Sound proofing" means reduction volume of sound and not the complete elimination of sound and does not require the reduction of sound to inaudible. The soundproofing in not limited to these materials. Additionally, at least a portion of the interior surface may be covered in a cushioning material.

Another embodiment is to cover at least a portion of the interior surface of the portal with a material to cushion the portion of the surface. The cushioning of the interior surface reduces the risk of damage compared to a hard surface. The interior covering material can be a fabric, plastic, natural fiber, threaded material such as carpeting, artificial "hair". The same material can serve more than one purpose by reducing sound emanating from the portal and protecting the drone from destructive contact with the interior surface of the portal.

The portal claimed in this application has a feature of to secure the access through the door without moving parts. This is an advantage over devices and systems that use gates or other movable barriers to restrict access. Without these barriers, it would be possible for a drone to directly enter the structure. The invention of this application has side walls on the exterior shelf interrupt the flight of the drone and blocks visibility of the interior of the structure.

The interior of the structure is not open to the exterior by line sight. The exterior shelf side walls cover the opening in the door and block visibility so that a drone could fly into the structure. It requires a maneuver by the drone to rise above the side walls of an exterior shelf. The drone must then land. In some embodiments there is no interior shelf. This allows the drone to directly enter the door.

The methods claimed in this application fall into two categories, one that transits a portal under its own power and one that uses gravity.

In one embodiment, the drone rises to clear a side wall of the exterior shelf lands and deactivates its rotor temporarily. It a period of two (2) seconds is sufficient. However, in some embodiments, a longer temporary period may be used. The drone then reactivates its rotor and travels through the portal under its own power and rises above and interior shelf side wall. The temporary landing and deactivation are required by the configuration of the portal as direct flight is impossible.

In other embodiments, the drone rises above the side wall and lands deactivation its rotor and moving by gravity down an oblique angled plane.

In some embodiments, the reverse steps are used to exit the structure through the integral door portal Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The flow charts provided to illustrate the method can be performed in a different order. For example, two blocks shown in succession may, in fact, be executed substantially concurrently, or the blocks may sometimes be executed in the reverse order, depending upon the functionality involved.

Referring now to the drawings, FIG. 1 illustrates a plan view of a door 102 from the perspective of facing the outside of door 102, showing a side wall 104 of an outwardly facing shelf. A door knob 106 is shown for context. The side wall obscures the opening to the interior and exterior of the door.

Figure 2:
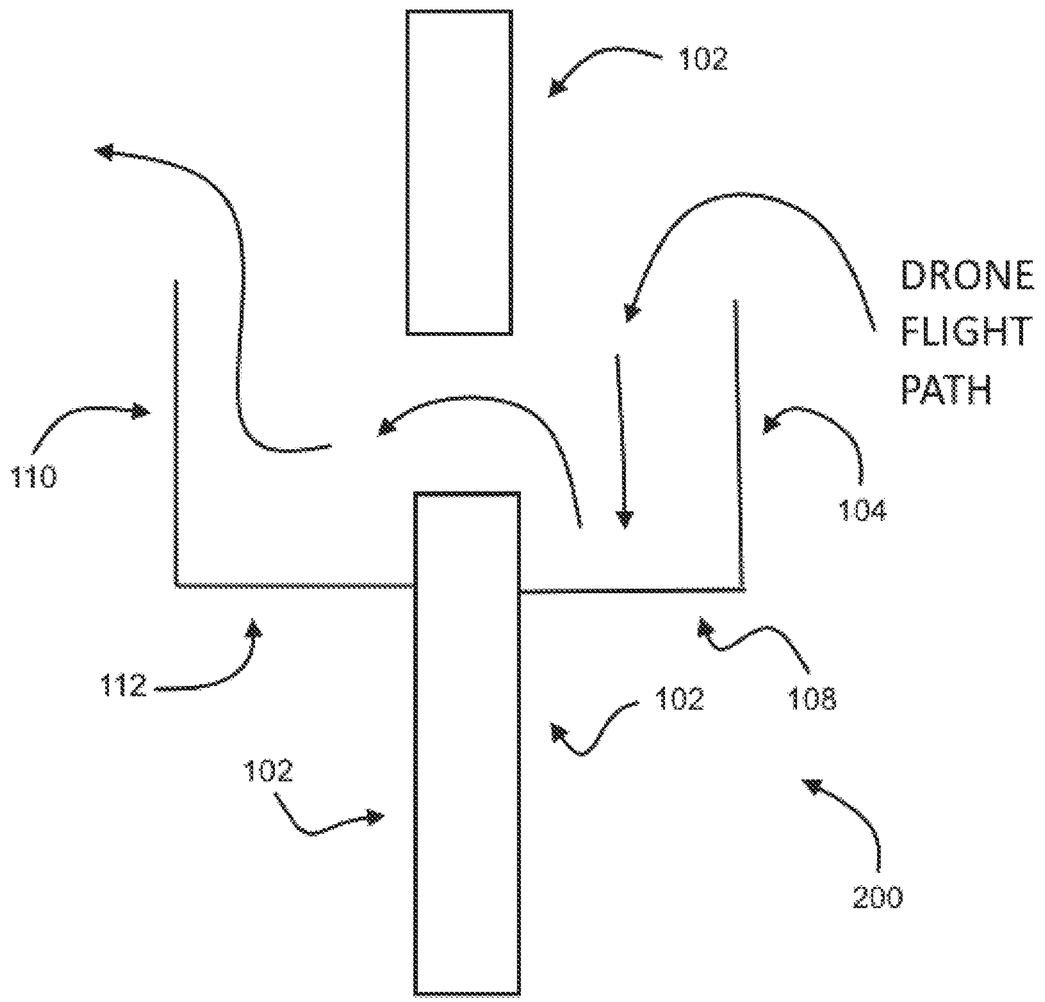
FIG. 2 is a cross-sectional view of the portal. The cross section of the door and embodiment having lower level.

Turning to FIG. 2, a cross sectional view of the portal 200 and door 102. The cross section is normal to the longitudinal axis of the door. An embodiment of the invention has two (2) level an upper level 116 and a lower level 114. The portal has and exterior shelf 108 having sidewall(s) 104 extending upwardly from and the exterior shelf 108. Door 102 extends above the lower level 116 forming the upper surface 114.

The flight path of a drone arriving from the outside is indicated. The first arrow shows the drone arriving above the elevation of sidewall 104. The second arrow shows lower level 116. It deactivates is rotor(s) and reactivates its rotor (s). The landing may be as little as two (2) seconds as previously described. The third arrow shows the flight path of the drone through the portal 200 through the door 102. The fourth arrow shows path of the drone rising above the interior side wall 110 and exiting the portal. The portal has no moving parts.

Figure 3:
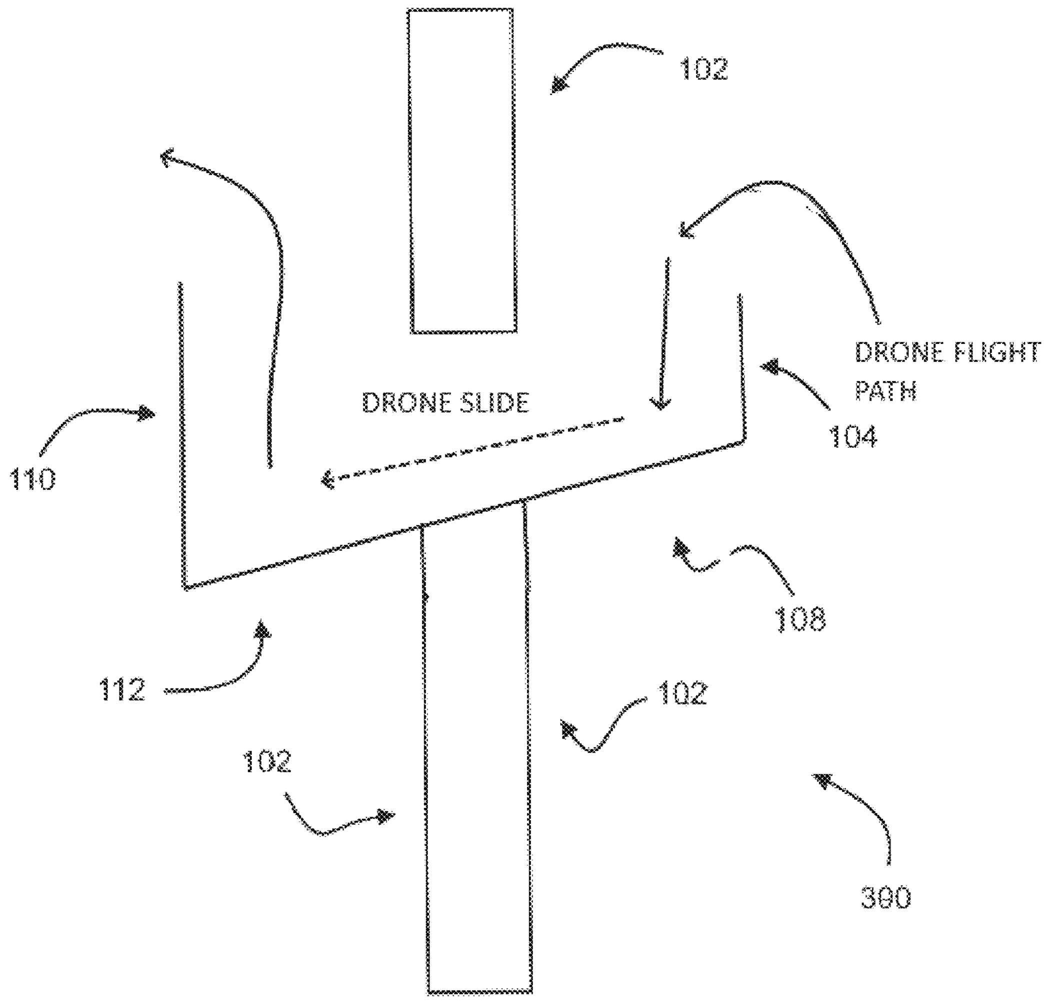
FIG. 3 is a cross-sectional view of another embodiment of the portal having a lower surface having an oblique angle.

FIG. 3 illustrates another embodiment of the portal 300. This embodiment also has a door 102 an interior and exterior shelf with sidewall 104. However, in this embodiment, the lower level 112 is at an oblique angle. The drone path illustrates the drone flight path rising over the exterior side wall 104. The second arrow shows the drone landing on lower surface 112. The drone deactivates its rotor(s). The drone slides as show by a broken line. The drone moves through the portal 300 by gravity. Optionally, the drone can reactivate its rotor(s) and rise above the interior side wall. 110. This embodiment also does not have a moving part.

Figure 4:
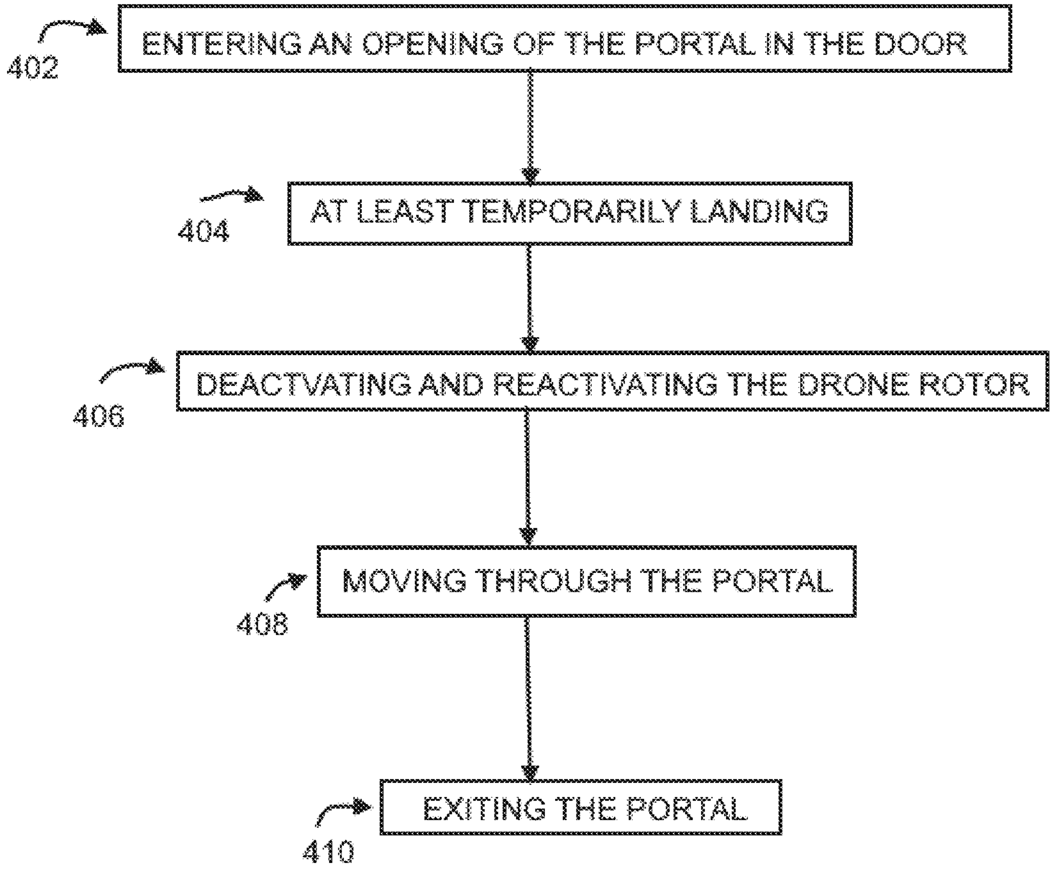
FIG. 4 is a flow chart of a method of an embodiment having a temporary landing area.

FIG. 4 is a flow chart a flow chart of a method at step 402 where the drone enters the opening of the portal in the door. The method corresponds to the structure in FIG. 1. At step 504 the done lands on the lower level of the portal . . . "In the door" in this application includes a portal integral to the door without a moving part. At step 404 the drone temporarily lands. Then, it deactivates and reactivates the drone rotor. The temporary landing is as little as 2 seconds. At step 408 the drone moves through the portal and at step 410 the drone exits the portal.

Figure 5:
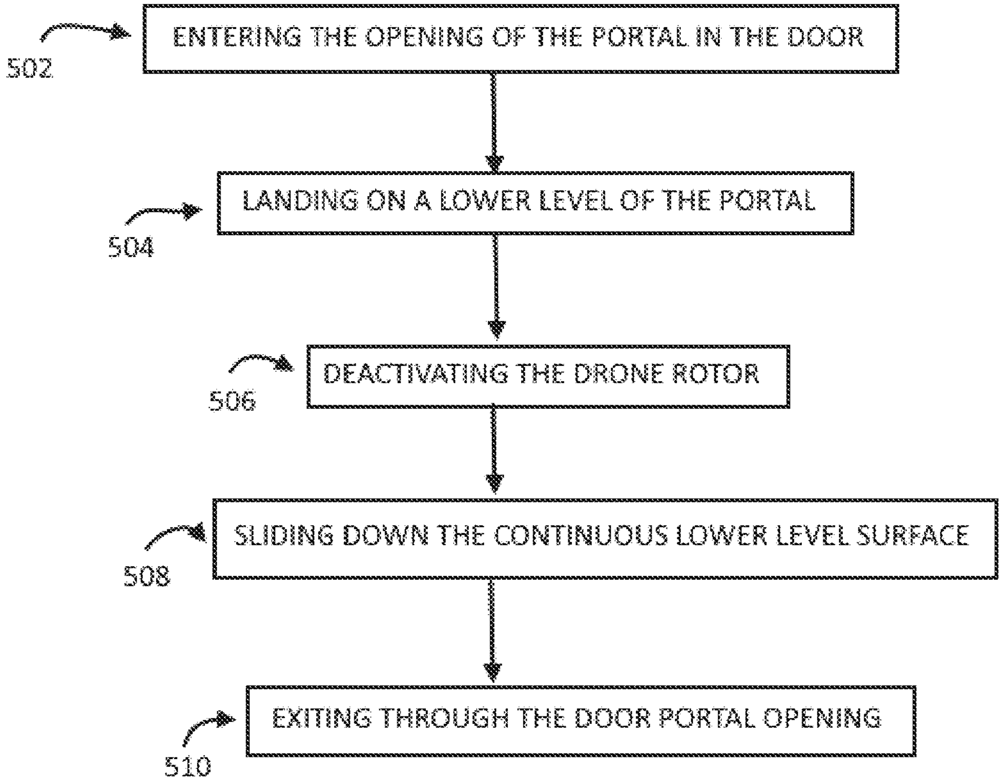
FIG. 5 is a flow chart of another embodiment of a method having a landing area to allow a UAV to slide from one side of the portal to the other.

FIG. 5 is a flow chart of another method embodiment of the invention. At step 502 in this method, it begins with entering the opening of the portal in the door. At step 506 the drone deactivates its rotors(s). Unlike the previous embodiment, the drone deactivates its rotor(s) and the landing is not temporary. Step 508 has the drone sliding down the continuous lower level surface and at step 510. The drone exits the door portal opening. Optionally, there is an interior shelf with sidewalls. At step 508 the drone slides onto the interior shelf. Optionally, there is a stop on the lower surface of the portal to arrest the slide of the drone. A further option is an additional step for the drone to reactivate its rotors and rise flying in the interior of the structure.

It is expected that during the life of a patent maturing from this application many relevant portals will be developed and the scope of the term portals is intended to include all such new technologies a priori.

The use of term "door" also means includes a barrier, wall, and roof

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A drone portal integral to a door for transit of a drone therethrough, the portal comprising:

an opening in the door positioned between an exterior face and an interior face of the door, the opening having a lower side;

a channel within the opening, the channel comprising:

a first shelf extending from a first side of the door, adjacent to and at a first level lower than the lower side of the opening, the first shelf presenting a landing surface sized to support the drone at rest thereon;

a second shelf extending from a second side of the door, adjacent to and at a second level lower than the lower side of the opening, the second shelf presenting a landing surface sized to support the drone at rest thereon;

a side wall extending upwardly from a distal end of the first shelf to a height above the lower side of the opening; and an elevated portion of the channel disposed between the first shelf and the second shelf and rising above each of the landing surfaces so as to divide the channel into the first shelf and the second shelf;

wherein the side wall and the elevated portion are arranged such that no straight-line path extends through the channel between the exterior face and the interior face of the door; and wherein the channel is devoid of moving parts and is unobstructed by any movable closure member.

2. The drone portal of claim 1, further comprising a second side wall extending upwardly from a distal end of the second shelf, the side wall of the first shelf and, where present, the second side wall each obscuring a line of sight into the opening from the respective face of the door.

3. The drone portal of claim 1, wherein the elevated portion is defined by a threshold of the door extending above the first shelf and the second shelf, such that transit of the drone through the opening requires the drone to ascend from one shelf, over the elevated portion, and descend onto the other shelf.

4. The drone portal of claim 1, wherein at least a portion of the channel is covered with a material that is one or more of sound proofing, cushioning, a woven fabric, and a flexible tufted fiber.

5. A drone portal integral to a door for transit of a drone therethrough, the portal comprising:

an opening in the door, the opening having a lower side; and a channel within the opening, the channel comprising a continuous surface extending from a first side of the door to a second side of the door, the continuous surface being inclined at an oblique angle such that a first portion of the continuous surface adjacent the first side of the door is at a higher elevation than a second portion adjacent the second side of the door, each of the first portion and the second portion being sized to support the drone at rest thereon;

a side wall extending upwardly from a distal end of the first portion to a height above the lower side of the opening, such that the drone is required to clear the side wall to enter the channel and no straight-line path extends through the channel between the first side and the second side of the door;

wherein the channel is devoid of moving parts and is unobstructed by any movable closure member.

6. The drone portal of claim 5, further comprising a second side wall extending upwardly from a distal end of the second portion.

7. The drone portal of claim 5, wherein at least a portion of the channel is covered with a material that is one or more of sound proofing, cushioning, a woven fabric, and a flexible tufted fiber.

8. The drone portal of claim 5, further comprising a stop projecting upwardly from the second portion of the continuous surface and positioned to arrest sliding movement of the drone along the continuous surface.

* * * * *